(12) United States Patent
Gonzalez et al.

(10) Patent No.: US 12,384,552 B2
(45) Date of Patent: Aug. 12, 2025

(54) METHOD OF REDUCING NOISE OF AIRCRAFT HAVING HYBRID POWER PLANTS

(71) Applicant: PRATT & WHITNEY CANADA CORP., Longueuil (CA)

(72) Inventors: Jeremy Paul Francisco Gonzalez, Montreal (CA); Ninad Joshi, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 552 days.

(21) Appl. No.: 17/704,990

(22) Filed: Mar. 25, 2022

(65) Prior Publication Data
US 2023/0303261 A1    Sep. 28, 2023

(51) Int. Cl.
*B64D 31/12*    (2006.01)
*B64D 31/18*    (2024.01)
*B64D 35/025*    (2025.01)

(52) U.S. Cl.
CPC .............. *B64D 31/12* (2013.01); *B64D 31/18* (2024.01); *B64C 2220/00* (2013.01); *B64D 35/025* (2024.01)

(58) Field of Classification Search
CPC ...... B64D 31/12; B64D 31/18; B64D 35/025; B64D 27/026; B64D 27/24; B64C 2220/00; B64C 11/50; Y02T 50/60
See application file for complete search history.

(56) References Cited

U.S. PATENT DOCUMENTS

| | | | |
|---|---|---|---|
| 5,789,678 A | 8/1998 | Pla | |
| 6,712,314 B2 | 3/2004 | Stephan | |
| 7,100,868 B2 | 9/2006 | Stephan | |
| 9,415,870 B1* | 8/2016 | Beckman | B64U 50/19 |
| 9,415,890 B2 | 8/2016 | Beckman et al. | |
| 10,843,807 B2 | 11/2020 | Bevirt et al. | |
| 10,933,977 B2* | 3/2021 | Gartenberg | B64D 35/022 |
| 10,946,953 B2 | 3/2021 | Pantalone et al. | |

(Continued)

OTHER PUBLICATIONS

European Search report issued on Aug. 8, 2023 for corresponding application 23164485.7.

*Primary Examiner* — Hunter B Lonsberry
*Assistant Examiner* — Jalal C Coduroglu
(74) *Attorney, Agent, or Firm* — NORTON ROSE FULBRIGHT CANADA LLP

(57)    ABSTRACT

A method of reducing noise includes: driving a first propulsor using one or more of the first electrical motor and the first thermal engine, and driving a second propulsor of the second hybrid power plant using one or more of the second electrical motor and the second thermal engine; receiving a signal indicative of an initial combined noise signature; determining, from the signal, that an initial amplitude variation of a periodically fluctuating amplitude of the initial combined noise signature is greater than an amplitude variation threshold; modulating a thrust produced by the second hybrid power plant, by changing a power output of the second thermal engine or the second electrical motor, to produce a modulated combined noise signature having a modulated amplitude variation less than the initial amplitude variation; and compensating for a difference in thrusts generated by the first hybrid power plant and the second hybrid power plant.

11 Claims, 5 Drawing Sheets

(56) References Cited

U.S. PATENT DOCUMENTS

| | | |
|---|---|---|
| 11,014,682 B2 | 5/2021 | Colavincenzo et al. |
| 2004/0204286 A1* | 10/2004 | Stridsberg .............. B60K 6/547 |
| | | 475/5 |
| 2011/0288740 A1 | 11/2011 | Sahm et al. |
| 2015/0298797 A1* | 10/2015 | Friedel ................... B64C 13/16 |
| | | 244/92 |
| 2018/0346139 A1 | 12/2018 | Ferran et al. |
| 2019/0337608 A1 | 11/2019 | Beckman et al. |
| 2020/0081432 A1* | 3/2020 | Szmuk .................... B64C 39/08 |
| 2020/0269990 A1* | 8/2020 | Bevirt .................... B64D 31/06 |
| 2020/0309045 A1* | 10/2020 | Gomez ................. B64D 35/08 |
| 2020/0391879 A1* | 12/2020 | Snider .................... B64C 27/28 |
| 2021/0033101 A1* | 2/2021 | Gemin ................... H02K 7/1823 |
| 2021/0062726 A1* | 3/2021 | Kathirchelvan .......... F02C 9/00 |
| 2021/0171212 A1* | 6/2021 | Keller .................... B64D 31/18 |
| 2022/0068057 A1* | 3/2022 | Nguyen ................. G01N 29/46 |
| 2022/0144439 A1* | 5/2022 | Roberts .................. F02N 11/04 |
| 2022/0283583 A1* | 9/2022 | Zamora ................ G05D 1/0088 |
| 2023/0182916 A1* | 6/2023 | Resnick ................. B60L 58/12 |

\* cited by examiner

METHOD OF REDUCING NOISE OF AIRCRAFT HAVING HYBRID POWER PLANTS

TECHNICAL FIELD

The present disclosure relates generally to aircraft engines and, more particularly, to hybrid aircraft engines and the reduction of noise emitted by such engines.

BACKGROUND

For aircraft having two or more engines, engine-to-engine variability may result in mechanical and acoustic interactions between the engines which can negatively impact the cabin noise levels. Typically, each engine emits a respective noise signature at a respective frequency and amplitude. When combined, the noise signatures of both engines may generate beats. Beats is a noise phenomenon that occurs when two noise signature having similar frequencies interact with one another to generate a noise signature having an amplitude that varies with time. Beats are thus the periodic and repeating fluctuations heard in the intensity of a sound when two sound waves of similar frequencies interfere with one another. These beats may create undesirable effects in the cabin. Improvements are therefore sought.

SUMMARY

In one aspect, there is provided a method of reducing noise generated by an aircraft having a propulsion system including a first hybrid power plant and a second hybrid power plant, the first hybrid power plant including a first electrical motor and a first thermal engine, the second hybrid power plant including a second electrical motor and a second thermal engine, the method comprising: driving a first propulsor of the first hybrid power plant using one or more of the first electrical motor and the first thermal engine, and driving a second propulsor of the second hybrid power plant using one or more of the second electrical motor and the second thermal engine; receiving a signal from one or more acoustic sensors, the signal indicative of an initial combined noise signature produced by the propulsion system, the combined noise signature resulting from a first noise signature generated by the first hybrid power plant and a second noise signature generated the second hybrid power plant, determining, from the signal, that an initial amplitude variation of a periodically fluctuating amplitude of the initial combined noise signature is greater than an amplitude variation threshold indicative that the initial combined noise signature generates beats; modulating a thrust produced by the second hybrid power plant, by changing a power output of one of the second thermal engine and the second electrical motor, to produce a modulated combined noise signature having a modulated amplitude variation less than the initial amplitude variation; and compensating for a difference in thrusts generated by the first hybrid power plant and the second hybrid power plant due to the modulating of the thrust produced by the second hybrid power plant.

The method may include any of the following features in any combinations.

In some embodiments, the driving of the first propulsor and the driving of the second propulsor includes setting rotational speeds of output shafts of the first electrical motor and of the second electrical motor to meet thrust targets of the first propulsor and of the second propulsor, the modulating of the thrust produced by the second hybrid power plant includes changing the power output of the second thermal engine to change the thrust of the second hybrid power plant.

In some embodiments, the driving of the first propulsor and the driving of the second propulsor includes setting rotational speeds of output shafts of the first thermal engine and of the second thermal engine to meet thrust targets of the first propulsor and of the second propulsor, the modulating of the thrust produced by the second hybrid power plant includes changing the power output of the second electrical motor to change the thrust of the second hybrid power plant.

In some embodiments, the modulating of the thrust produced by the second hybrid power plant includes setting a rotational speed of an output shaft of the second thermal engine to be greater than a rotational speed of an output shaft of the first thermal engine.

In some embodiments, the compensating for the difference in the thrusts includes increasing a rotational speed of an output shaft of the first electrical motor to be greater than a rotational speed of an output shaft of the second electrical motor until a first thrust generated by the first propulsor is equal to a second thrust generated by the second propulsor, or decreasing the rotational speed of the output shaft of the second electrical motor to be less than the rotational speed of the output shaft of the first electrical motor until the second thrust generated by the second propulsor is equal to the first thrust generated by the first propulsor.

In some embodiments, the modulating of the thrust of the second power plant includes setting a rotational speed of an output shaft of the second electrical motor to be greater than a rotational speed of an output shaft of the first electrical motor.

In some embodiments, the compensating for the difference in the thrusts includes increasing a rotational speed of an output shaft of the first thermal engine to be greater than a rotational speed of an output shaft of the second thermal engine until a first thrust generated by the first propulsor is equal to a second thrust generated by the second propulsor, or decreasing the rotational speed of the output shaft of the second thermal engine to be less than the rotational speed of the output shaft of the first thermal engine until the second thrust generated by the second propulsor is equal to the first thrust generated by the first propulsor.

In some embodiments, the second propulsor is a propeller having blades pivotable about respective blade axes, the compensating for the difference in the thrusts includes pivoting the blades about the blade axes until the thrusts generated by the second propulsor matches a first thrust generated by the first propulsor.

In some embodiments, the compensating for the difference in the thrusts includes changing a position of one or more control surfaces of the aircraft until a propulsor moment created by a thrust difference generated by the first propulsor and the second propulsor about a yaw axis of the aircraft is compensated by a moment created by the one or more control surfaces of the aircraft about the yaw axis.

In some embodiments, the changing of the position of the one or more control surfaces of the aircraft includes changing a position of a rudder of a vertical stabilizer of the aircraft.

In some embodiments, the modulating of the thrust produced by the second propulsor includes increasing the power output of the one of the second thermal engine and the second electrical motor.

In another aspect, there is provided a propulsion system for an aircraft comprising: a first hybrid power plant drivingly engageable to a first propulsor, the first hybrid power plant including a first thermal engine and a first electrical motor; a second hybrid power plant drivingly engageable a second propulsor, the second hybrid power plant including a second thermal engine and a second electrical motor; one or more acoustic sensors operable to measure an initial combined noise signature produced by the propulsion system, the combined noise signature resulting from a combination of a first noise signature generated by the first hybrid power plant and a second noise signature generated the second hybrid power plant; and a controller operatively connected to the first hybrid power plant, the second hybrid power plant, and the one or more acoustic sensors, the controller having a processing unit and a computer-readable medium having instructions stored thereon executable by the processing unit for: receiving a signal from the one or more acoustic sensors, the signal indicative of the initial combined noise signature produced by the propulsion system, determining, from the signal, that an initial amplitude variation of a periodically fluctuating amplitude of the initial combined noise signature is greater than an amplitude variation threshold indicative that the initial combined noise signature generates beats; modulating a thrust produced by the second hybrid power plant, by changing a power output of one of the second thermal engine and the second electrical motor, to produce a modulated combined noise signature having a modulated amplitude variation less than the initial amplitude variation; and compensating for a difference in thrusts generated by the first hybrid power plant and the second hybrid power plant due to the modulating of the thrust produced by the second hybrid power plant.

The propulsion system may include any of the following features in any combinations.

In some embodiments, the driving of the first propulsor and the driving of the second propulsor includes setting rotational speeds of output shafts of the first electrical motor and of the second electrical motor to meet thrust targets of the first propulsor and of the second propulsor, the modulating of the thrust produced by the second hybrid power plant includes changing the power output of the second thermal engine to change the thrust of the second hybrid power plant.

In some embodiments, the driving of the first propulsor and the driving of the second propulsor includes setting rotational speeds of output shafts of the first thermal engine and of the second thermal engine to meet thrust targets of the first propulsor and of the second propulsor, the modulating of the thrust produced by the second hybrid power plant includes changing the power output of the second electrical motor to change the thrust of the second hybrid power plant.

In some embodiments, the modulating of the thrust produced by the second hybrid power plant includes setting a rotational speed of an output shaft of the second thermal engine to be greater than a rotational speed of an output shaft of the first thermal engine.

In some embodiments, the compensating for the difference in the thrusts includes increasing a rotational speed of an output shaft of the first electrical motor to be greater than a rotational speed of an output shaft of the second electrical motor until a first thrust generated by the first propulsor is equal to a second thrust generated by the second propulsor, or decreasing the rotational speed of the output shaft of the second electrical motor to be less than the rotational speed of the output shaft of the first electrical motor until the second thrust generated by the second propulsor is equal to the first thrust generated by the first propulsor.

In some embodiments, the modulating of the thrust produced by of the first hybrid power plant includes setting a rotational speed of an output shaft of the second electrical motor to be different than a rotational speed of an output shaft of the first electrical motor.

In some embodiments, the compensating for the difference in the thrusts includes increasing a rotational speed of an output shaft of the first thermal engine to be greater than a rotational speed of an output shaft of the second thermal engine until a first thrust generated by the first propulsor is equal to a second thrust generated by the second propulsor, or decreasing the rotational speed of the output shaft of the second thermal engine to be less than the rotational speed of the output shaft of the first thermal engine until the second thrust generated by the second propulsor is equal to the first thrust generated by the first propulsor.

In some embodiments, the second propulsor is a propeller having blades pivotable about blade axes, the compensating for the difference in the thrusts includes pivoting the blades about the blade axes until the thrusts generated by the second propulsor matches a first thrust generated by the first propulsor.

In some embodiments, the compensating for the difference in the thrusts includes changing a position of one or more control surfaces of the aircraft until a propulsor moment created by a thrust difference generated by the first propulsor and the second propulsor about a yaw axis of the aircraft is compensated by a moment created by the one or more control surfaces of the aircraft about the yaw axis.

BRIEF DESCRIPTION OF THE DRAWINGS

Reference is now made to the accompanying figures in which.

DETAILED DESCRIPTION

Figure 1:
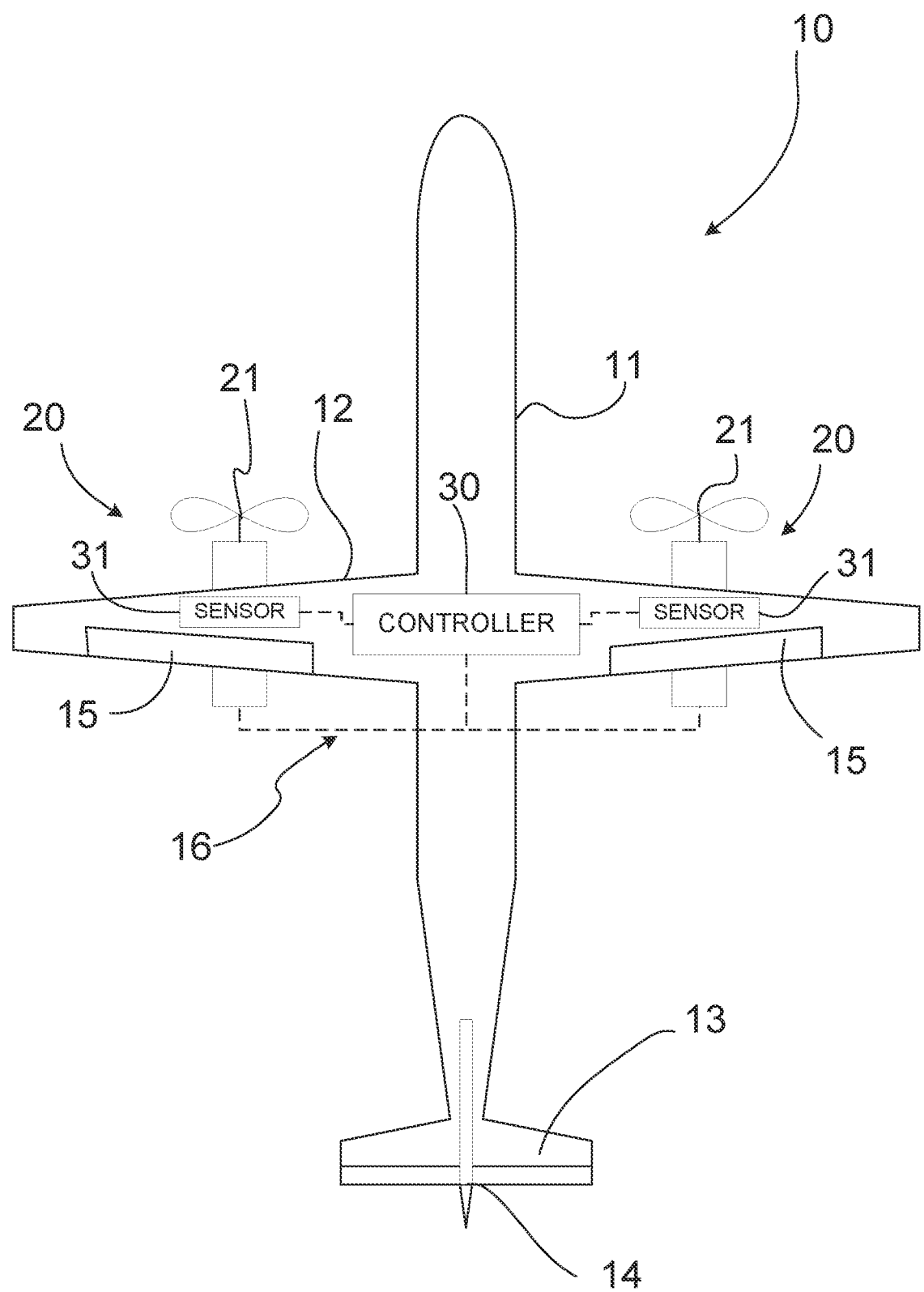
FIG. 1 is a schematic top view of an aircraft having two hybrid power plants.

Referring to FIG. 1, an aircraft is shown generally at 10. The aircraft 10 includes a fuselage 11, wings 12 mounted to the fuselage 11, a horizontal stabilizer 13 mounted to a rear end of the fuselage 11, a vertical stabilizer 14 mounted to the rear end of the fuselage 11, and ailerons 15 mounted on the wings 12. The horizontal stabilizer 13 is used to control the aircraft 10 about a pitch axis; the vertical stabilizer 14 is used to control the aircraft 10 about a yaw axis; and the ailerons 15 are used to control the aircraft about a roll axis. The aircraft 10 is equipped with a propulsion system 16. In the present embodiment, the propulsion system 16 includes two hybrid power plants 20, although the aircraft 10 may be equipped with more than two hybrid power plants 20. A controller 30 is operatively connected to the hybrid power plants 20 via suitable communication links. The controller 30 may be a controller of the aircraft 10. These communication links may be hard wires, wireless links, or any combination thereof. In the embodiment shown, each of the hybrid power plants 20 includes a propulsor 21. As depicted, the propulsor 21 may be a propeller or, any other means operable to generate a thrust for propelling the aircraft 10. For instance, the propulsor 21 may be a fan, a rotor, and so on.

The aircraft 10 is equipped with one or more acoustic sensors 31 (or simply "sensors" 31), which are operatively connected to the controller 30. Although two sensors 31 are depicted in FIG. 1, more or less than two sensors 31 may be used. In the depicted embodiment, each of the sensors 31 is located proximate a respective one of the hybrid power plants 20. For instance, each of the two sensors 31 may be located in a vicinity of a respective one of the hybrid power plants 20. The acoustic sensors 31, which may be microphones or other suitable pressure transducers, are used to measure noise signatures emitted by the hybrid power plants 20. The two sensors 31 may generate signals indicative of the noise signatures generated by the two hybrid power plants 20. In some other embodiments, each of the two hybrid power plants 20 may include two electrical motors, two thermal engines, or one electrical motor and one thermal engine.

Figure 2:
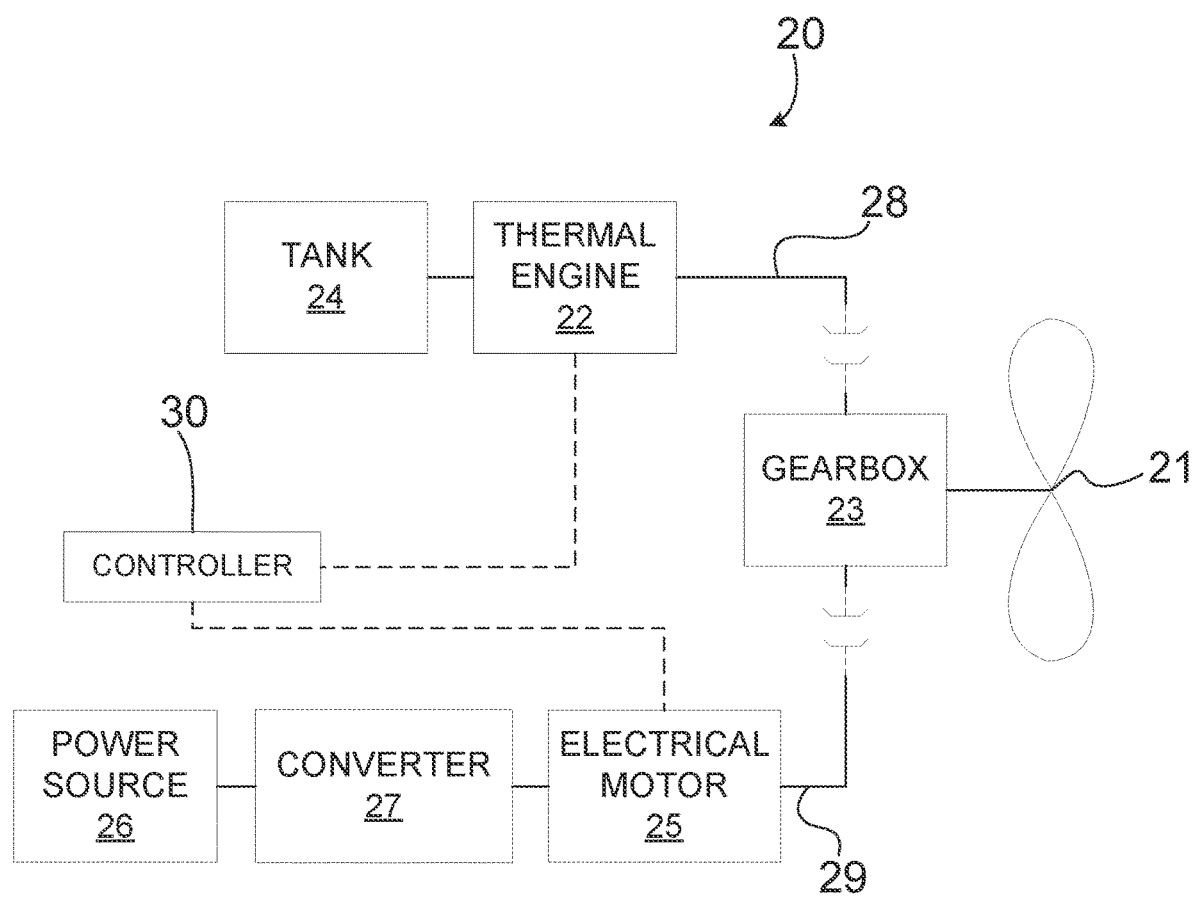
FIG. 2 is a schematic view of one of the two hybrid power plants of the aircraft of FIG. 1.

Referring more particularly to FIG. 2, one of the two hybrid power plants 20 is shown and described in greater detail. The description below uses the singular form, but it applies to each of the two hybrid power plants 20. In the embodiment shown, the hybrid power plant 20 includes a thermal engine 22 that is drivingly engageable to the propulsor 21 via a gearbox 23. The thermal engine is fluidly connected to a tank 24 that contains a fuel. The thermal engine 22 may be any engine that relies on combustion for its operation. For instance, the thermal engine 22 may be an internal combustion engine such as a piston engine, a rotary engine, or any engine having a combustion chamber of varying volume. The thermal engine 22 may be a gas turbine engine comprising a compressor, a combustor, and a turbine. The hybrid power plant 20 further includes an electrical motor 25 that is drivingly engageable to the propulsor 21 via the gearbox 23. The electrical motor 25 may be operatively connected to a power source 26, such as a battery, via a converter 27. The power source 26 may alternatively be a generator. The converter 27 may be used to transform a direct current from the power source 26 to an alternating current supplied to the electrical motor 25. Any suitable electrical motor 25 may be used. As shown in FIG. 2, the thermal engine 22 and the power source 26 may be operatively connected to the controller 30. This may allow to use the thermal engine 22 as the power source for the electrical motor 25. In other words, the thermal engine 22 may be used to recharge the batteries.

The gearbox 23 is operable to combine inputs of both of the thermal engine 22 and the electrical motor 25 to deliver a common output to drive a common load, which herein corresponds to the propulsor 21. Stated differently, the gearbox 23 is drivingly engaged by an output shaft 28 of the thermal engine 22 and by an output shaft 29 of the electrical motor 25. The gearbox 23 may include clutches to selectively engage and disengage the thermal engine 22 and the electrical motor 25 from the propulsor 21. For instance, the clutches may disengage one of the thermal engine 22 and the electrical motor 25 if a thrust requirement of the aircraft 10 is such that only power generated by the other of the thermal engine 22 and the electrical motor 25 is required. These clutches may be one-way clutches, friction clutches, and so on. The clutches may disengage either of the thermal engine 22 or the electrical motor 25 from the gearbox 23 as a function of a thrust requirement of the aircraft 10.

In use, each of the two hybrid power plants 20 generate their own respective noise signature. The noise signatures of the hybrid power plants 20 may be generated by the thermal engine 22, the electrical motor 25, the propulsor 21, and any combinations thereof. These noise signatures have an amplitude and a frequency. Even if the two hybrid power plants 20 are generally identical (e.g., same make, model number, etc), small differences in manufacturing tolerances, usage history, deterioration characteristics, maintenance actions, and so on may create small discrepancies between the noise signatures generated by the two hybrid aircraft power plants 20. Since each noise signature has its own amplitude and frequency, the noise signatures of both power plants 20 combined may exhibit a constructive interference or a destructive interference. A destructive interference occurs when the two noise signatures are out of phase with one another such that a peak in the noise signature of one of the two hybrid power plants 20 occurs at the same time as a valley in the noise signature of the other of the two hybrid power plants 20. During a destructive interference, the noises generated by the two hybrid power plants 20 effectively cancel each other out. A constructive interference occurs when peaks (or valleys) of both of the two noise signatures of the two hybrid power plants 20 occur simultaneously effectively amplifying each other. These interferences between the two noise signatures, either they be constructive, partially constructive, destructive, or partially destructive, may generate beats. Beats are periodic and repeating fluctuations heard in the intensity of a sound when two sound waves of very similar frequencies interfere with one another. In other words, although each of the two noise signatures taken individually has a respective amplitude, this amplitude typically does not vary with time. However, when the two noise signatures are combined, the resultant noise signature exhibit an amplitude that periodically increase and decrease over time. This periodic variation of the amplitude generate the beats that are detrimental to passenger comfort in the cabin of the aircraft 10.

The present disclosure proposes a method used to reduce the overall noise signature generated by the combined hybrid power plants 20. The method involves modulating a rotational speed of one of the two hybrid power plants 20 to cause at least partial destructive interference between the two noise signatures and to mitigate the formation of beats. However, modulating the rotational speed of the one of the two hybrid power plants 20 may create a thrust imbalance between the two hybrid power plants 20. This thrust imbalance, which is caused by one of the two hybrid power plants 20 generating more thrust than the other, may generate a moment about a yaw axis Z (FIG. 4) of the aircraft 10 and other directional instabilities (e.g., a roll may be induced due to a higher lift on the wing supporting the hybrid power plant 20 that generates a higher thrust). This moment is compensated in some ways as described below. For instance, pitch angles defined by the blades of propellers may be altered to change (e.g., increase or decrease) the thrust generated by that propeller. Alternatively, the vertical stabilizer 14 may be angled in such a way as to maintain a desired direction of the aircraft 10 in accordance to the thrust imbalance. Ailerons and/or flaps may be used to compensate this thrust imbalance. In other words, a combination of the rudder and the ailerons may be used to counteract the moments generated about the yaw and roll axes of the aircraft 10. Any suitable combinations of the control surfaces of the aircraft 10 may be used to compensate this thrust imbalance.

The modulating of the rotational speed of the one of the two hybrid power plants 20 may be achieved by using either the electrical motor 25 or the thermal engine 22 as will be discussed below. In some cases, a power output of one of the electrical motor 25 and the thermal engine 22 is changed to impart this change in rotational speed of the propulsor 21.

Figure 3:
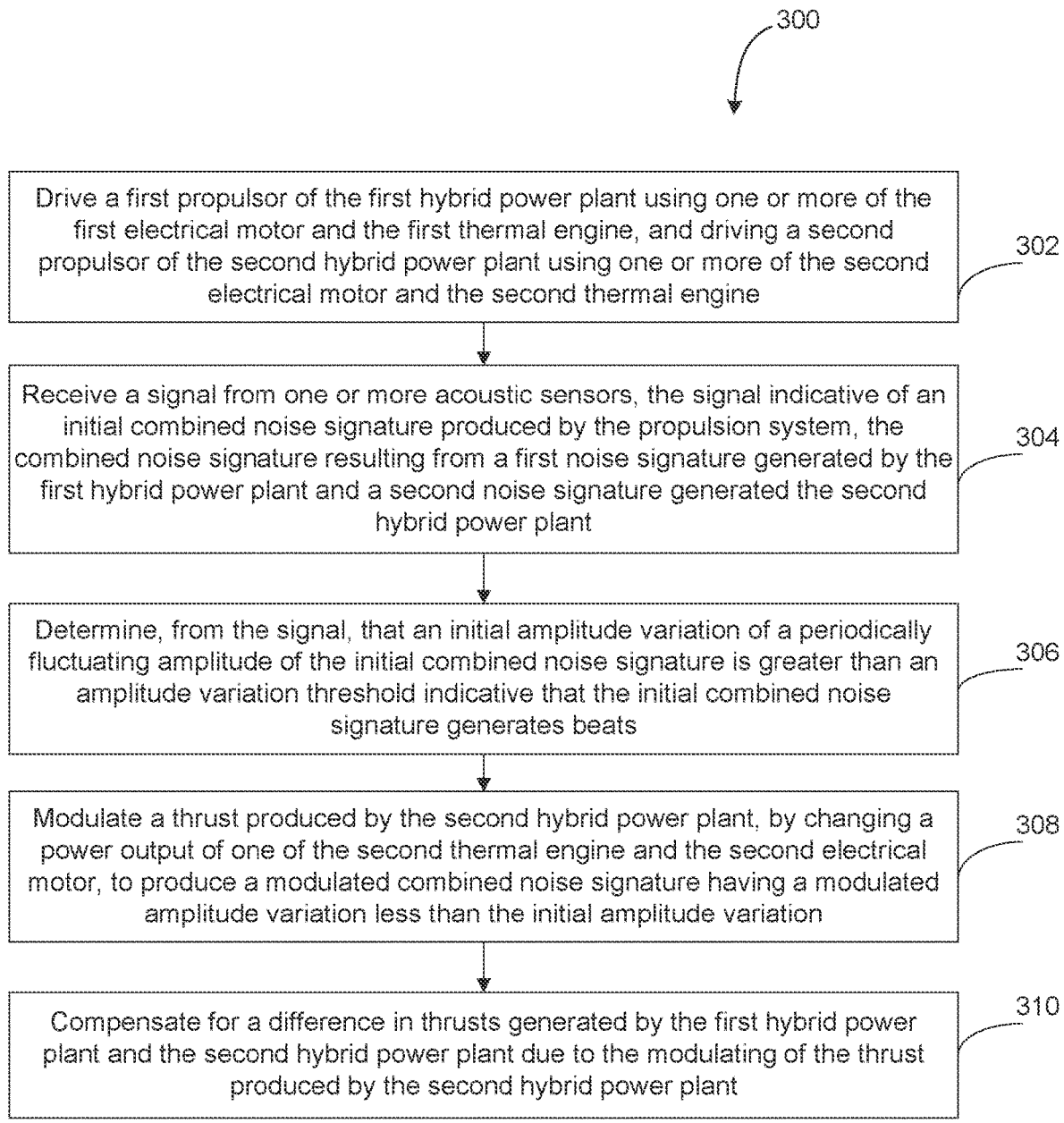
FIG. 3 is a flowchart illustrating steps of a method of reducing noise generated by the aircraft of FIG. 1.
Figure 4:
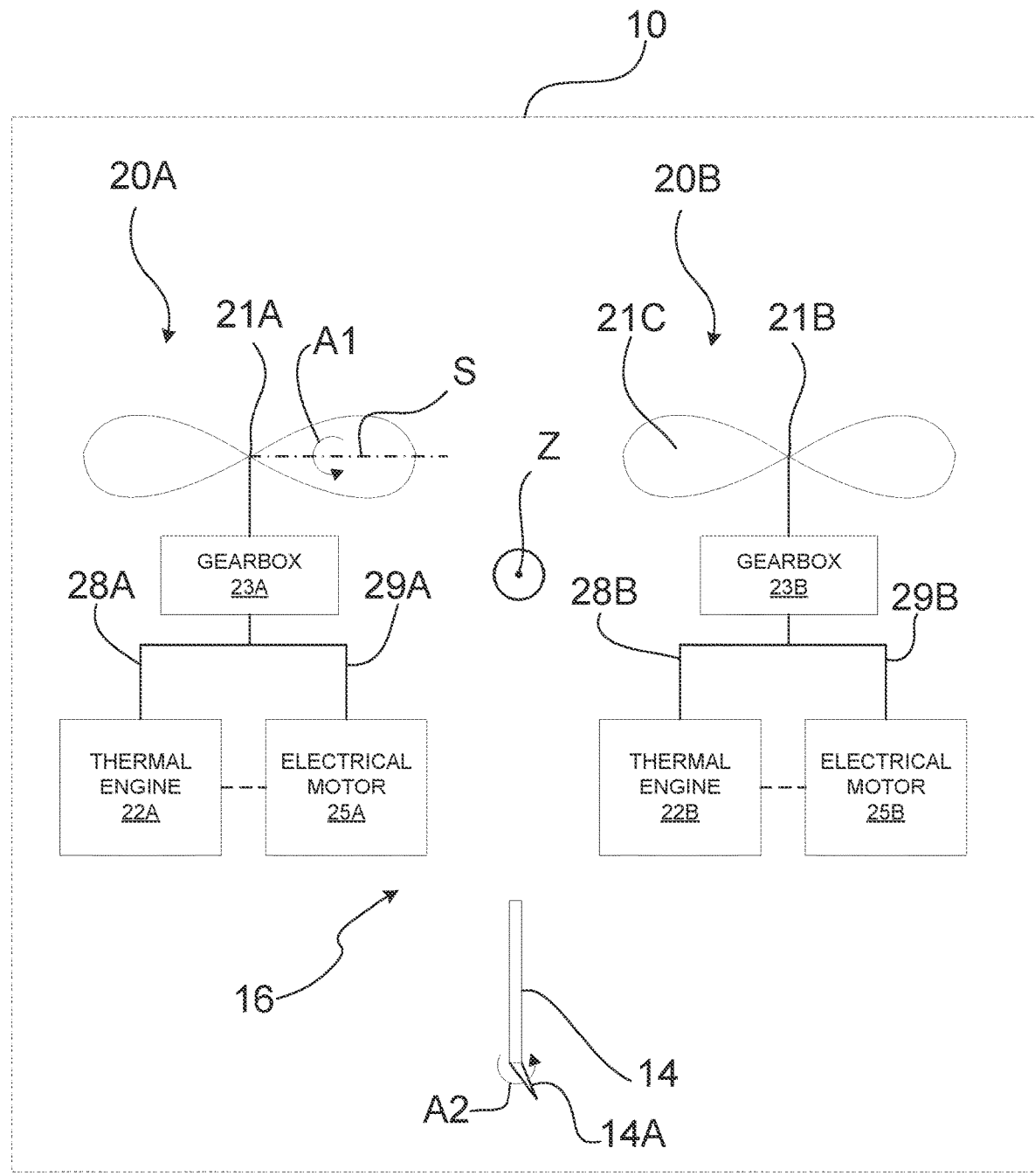
FIG. 4 is a schematic view of the aircraft of FIG. 1 illustrating operation of the two hybrid power plants of the aircraft of FIG. 1.

Referring now to FIGS. 3-4, a method of reducing the noise generated by the propulsion system 16 of the aircraft 10 having the two hybrid power plants 20 is shown at 300. The propulsion system 16 includes a first hybrid power plant 20A and a second hybrid power plant 20B. The method 300 includes determining that noise signatures of the two power plants 20A, 20B generate beats. As explained above, the beats are created when an amplitude of a noise signature periodically varies over time. Hence, this amplitude may have an amplitude variation between minimal and maximal values of the amplitude. When the amplitude variation exceeds a given threshold, it may be considered that the beats will impair passenger comfort inside the cabin of the aircraft 10. The method 300 then includes the modulating of the thrust produced by the second hybrid power plant 20A, which may be referred to as the slave hybrid power plant. This modulation in thrust may create a moment about a yaw axis of the aircraft. Adjustments may be carried on the slave hybrid power plant 20B until the thrust it generates matches that of the first hybrid power plant 20A, which may be referred to as the master hybrid power plant. Alternatively, the control surfaces of the aircraft 10 may be adjusted to compensate for this thrust imbalance.

The method 300 includes driving a first propulsor 21A of a first hybrid power plant 20A using one or more of a first electrical motor 25A and a first thermal engine 22A, and driving a second propulsor 21B of a second hybrid power plant 20B using one or more of a second electrical motor 25B and a second thermal engine 22B at 302; receiving a signal from one or more acoustic sensors 31, the signal indicative of an initial combined noise signature produced by the propulsion system 16, the combined noise signature resulting from a first noise signature generated by the first hybrid power plant 20A and a second noise signature generated the second hybrid power plant 20B at 304; determining, from the signal, that an initial amplitude variation of a periodically fluctuating amplitude of the initial combined noise signature is greater than an amplitude variation threshold indicative that the initial combined noise signature generates beats at 306; modulating a thrust produced by the second hybrid power plant 20A, by changing a power output of one of the second thermal engine 22B and the second electrical motor 25B, to produce a modulated combined noise signature having a modulated amplitude variation less than the initial amplitude variation at 308; and compensating for a difference in thrusts generated by the first hybrid power plant 20A and the second hybrid power plant 20B due to the modulating of the thrust produced by the second propulsor 21A at 310.

In one embodiment, the modulating of the thrust of the second hybrid power plant 20B may mitigate the beats. This characteristic may make it possible to reduce the levels of mechanical and acoustic noises. The surplus of power on one of the two hybrid power plants may thus be compensated by the adjustment of an angular position of blades of the propulsor on this same motor.

More specifically, in this embodiment, the driving of the first propulsor 21A and the driving of the second propulsor 21B at 302 includes setting rotational speeds of a first output shaft 29A of the first electrical motor 25A and of a second output shaft 29B of the second electrical motor 25B to meet thrust targets of the first propulsor 21A and of the second propulsor 21B. The modulating of the thrust produced by the second hybrid power plant 20B at 308 includes changing the power output of the second thermal engine 22B to change the thrust of the second hybrid power plant 20B. In some embodiments, the changing of the power output of the second thermal engine 22A to change the thrust of the second propulsor 21B includes increasing the power output of the second thermal engine 22B to increase the rotational speed of the second propulsor 21B. In some other embodiments, when the second propulsor 21B is driven by both of the second electrical motor 25B and the second thermal engine 22B, the changing of the power output of the second thermal engine 22B includes decreasing the power output of the second thermal engine 22B to decrease the thrust produced by the second propulsor 21B.

During cruise, the thrusts generated by the first and second hybrid power plants 20A, 20B may be provided solely by the electrical motors 25. Thus, the increasing of the power output of the second thermal engine 22B may include drivingly engaging the second thermal engine 22B to the second propulsor 21B via a second gearbox 23B and increasing a power output of the second thermal engine 22B from a standby power output to a power output sufficient to cause the variation in thrust.

Alternatively, the driving of the first propulsor 21A and the driving of the second propulsor 21B at 302 may include setting rotational speeds of a first output shaft 28A of the first thermal engine 22A and of a second output shaft 28B of the second thermal engine 22B to meet thrust targets of the first propulsor 21A and of the second propulsor 21B. The modulating of the thrust produced by the second hybrid power plant 20B at 308 may include changing the power output of the second electrical motor 25B to change the thrust produced by the second propulsor 21B. In some embodiments, the changing of the power output of the second electrical motor 25B to change the thrust produced by the second propulsor 21B includes increasing the power output of the second electrical motor 25B to increase the thrust produced by the second propulsor 21B. In some other embodiments, when the second propulsor 21B is driven by both of the second electrical motor 25B and the second thermal engine 22B, the changing of the power output of the second electrical motor 25B may include decreasing the power output of the second electrical motor 25B to decrease the thrust of the second propulsor 21B.

During cruise, the thrusts generated by the first and second hybrid power plants 20A, 20B may be provided solely by the thermal engines 22. Thus, the increasing of the power output of the second electrical motor 25B may include drivingly engaging the second electrical motor 25B to the second propulsor 21B via the second gearbox 23B and increasing a power output of the second electrical motor 25B to a power output sufficient to cause the variation in thrust.

In these embodiments, the thrust generated by the second propulsor 21B may become greater, or smaller in some embodiments, to the thrust generated by the first propulsor 21A. This may create a moment on the aircraft 10 about the yaw axis Z. The compensating for the difference in thrusts generated by the first hybrid power plant 20A and by the second hybrid power plant 20B at 310 may include pivoting blades 21C of the second propulsor 21B about respective blade axes S as depicted with arrow A1. The blades 21C thus pivoted may generate less thrust, or more in some embodiments, to change the thrust created by the second propulsor 21B to match the thrust generated by the first propulsor 21A.

Alternatively, the compensating for the difference in the thrusts at 310 may include changing a position of one or more of control surfaces of the aircraft 10 until a propulsor moment created by a thrust difference generated by the first propulsor 21A and the second propulsor 21B about the yaw axis Z of the aircraft 10 is compensated by a moment created by the one or more control surfaces of the aircraft 10 about the yaw axis Z. In the depicted embodiment, this is achieved by pivoting a rudder 14A of the vertical stabilizer 14 in a direction depicted by arrow A2. Other control surfaces, such as the ailerons 15, may be used to compensate for this propulsor moment.

In another embodiment, the speed of one of the thermal engines may be adjusted to mitigate the beats of the combined noise signature. Then, a surplus of speed may be provided by one of the electric engines to ensure an identical thrust on each hybrid power plant. More specifically, the first and second hybrid power plants 20A, 20B may be set to produce the same thrust. Once it is determined that beats are generated by the combination of the first and second noise signatures, the modulating of the thrust of the second propulsor 21B at 308 may include setting a rotational speed of the second output shaft 28B of the second thermal engine 22B to be greater than a rotational speed of the first output shaft 28A of the first thermal engine 22A. At which point, the compensating of the difference in the thrusts at 310 may include increasing a rotational speed of the first output shaft 29A of the first electrical motor 25B to be greater than a rotational speed of the second output shaft 29B of the second electrical motor 25B until a first thrust generated by the first propulsor 21A is equal to a second thrust generated by the second propulsor 21B. This effectively cancels out the thrust difference between the two propulsors 21A, 21B. Thus, the same thrust is generated by the two hybrid power plants 20A, 20B, but the amplitude variation of the combined noise signature of the two hybrid power plant 20A, 20B may be decreased.

Alternatively, the compensating of the difference in the thrusts at 310 may include decreasing a rotational speed of the second output shaft 29A of the second electrical motor 25B to be less than a rotational speed of the first output shaft 29A of the first electrical motor 25A until a second thrust generated by the second propulsor 21B is equal to a first thrust generated by the first propulsor 21A.

During cruise, the thrusts generated by the first and second hybrid power plants 20A, 20B may be provided solely by the thermal engines 22. The increasing of the rotational speed of the first output shaft 29A of the first electrical motor 25A may include drivingly engaging the first output shaft 29A of the first electrical motor 25A to the first propulsor 21A via a first gearbox 23A before the increasing of the rotational speed of the first output shaft 29A of the first electrical motor 25A. In this example, the second electrical motor 25B may remain at rest and, in some embodiments, disengaged from the second gearbox 23B.

In yet another embodiment, the speed of one of the electrical motors may be adjusted to mitigate the beats. Then, a surplus of speed via one of the thermal engines may be provided to ensure an identical thrust on each hybrid power plant. More specifically, once it is determined that beats are generated by the first and second noise signatures at 306, the modulating of the thrust produced by the second propulsor 21B at 308 may include setting a rotational speed of the second output shaft 29B of the second electrical motor 25B to be greater than a rotational speed of the first output shaft 29A of the first electrical motor 25A. At which point, the compensating for the difference in the thrusts at 310 may include increasing a rotational speed of the first output shaft 28A of the first thermal engine 22A to be greater than a rotational speed of the second output shaft 28B of the second thermal engine 22B until a first thrust generated by the first propulsor 21A is equal to a second thrust generated by the second propulsor 21B. Thus, the same thrust is generated by the two hybrid power plants 20A, 20B, but the amplitude variation of the combined noise signature of the two hybrid power plant 20A, 20B may be decreased.

Alternatively, the compensating for the difference in the thrusts at 310 may include decreasing a rotational speed of the second output shaft 28B of the second thermal engine 22B to be less than a rotational speed of the first output shaft 28A of the first thermal engine 22A until a second thrust generated by the second propulsor 21B is equal to a first thrust generated by the first propulsor 21A.

During cruise, the thrusts generated by the first and second hybrid power plants 20A, 20B may be provided solely by the electrical motors 25. The increasing of the rotational speed of the first output shaft 28A of the first thermal engine 22A may include drivingly engaging the first output shaft 28A of the first thermal engine 22A to the first propulsor 21A via the first gearbox 23A before the increasing of the rotational speed of the first output shaft 28A of the first thermal engine 22A. The increasing of the rotational speed of the first output shaft 28A of the first thermal engine 22A may include increasing a power output of the first thermal engine 22A from a standby power output. In this example, the second thermal engine 22B may remain in a standby mode and, in some embodiments, disengaged from the second gearbox 23B.

Figure 5:
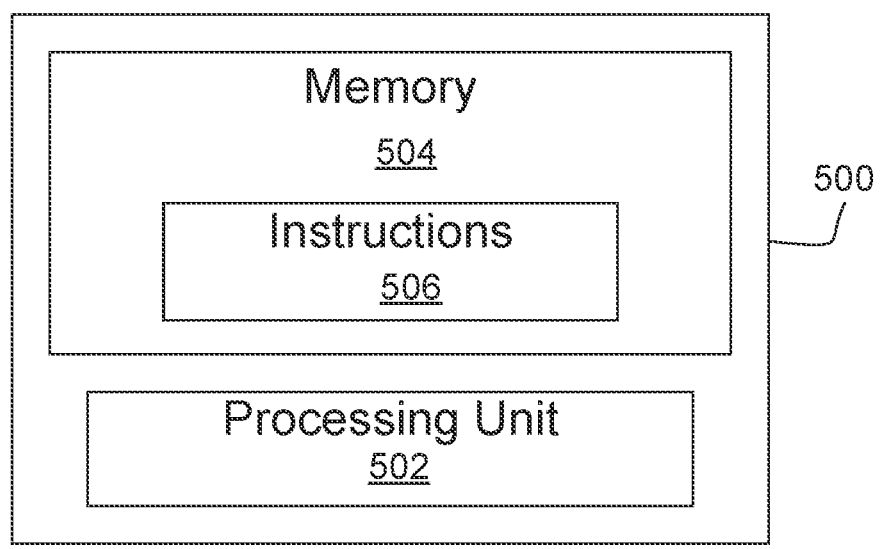
FIG. 5 is a schematic representation of a computing device in accordance with one embodiment.

With reference to FIG. 5, an example of a computing device 500 is illustrated. For simplicity only one computing device 500 is shown but the system may include more computing devices 500 operable to exchange data. The computing devices 500 may be the same or different types of devices. The controller 30 may be implemented with one or more computing devices 500. Note that the controller 30 can be implemented as part of a full-authority digital engine controls (FADEC) or other similar device, including electronic engine control (EEC), engine control unit (ECU), electronic propeller control, propeller control unit, and the like. In some embodiments, the controller 30 is implemented as a Flight Data Acquisition Storage and Transmission system, such as a FAST™ system. The controller 30 may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method of reducing noise generated by an aircraft having two hybrid power plants such that instructions 506, when executed by the computing device 500 or other programmable apparatus, may cause the functions/acts/steps performed as part of the method of reducing noise generated by an aircraft having two hybrid power plants as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for reducing noise generated by an aircraft having two hybrid power plants described herein may be implemented in a high level procedural or object oriented programming or scripting language, or a combination thereof, to communicate with or assist in the operation of a computer system, for example the computing device 500. Alternatively, the methods and systems for reducing noise generated by an aircraft having two hybrid power plants may be implemented in assembly or machine language. The language may be a compiled or interpreted language. Program code for implementing the methods and systems for reducing noise generated by an aircraft having two hybrid power plants may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for reducing noise generated by an aircraft having two hybrid power plants may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document suggest use of noise and/or vibration sensors. However, similar methods can also developed using dynamic-pressure, strain or similar fast-response measurements transducers.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of reducing noise generated by an aircraft having a propulsion system including a first hybrid power plant and a second hybrid power plant, the first hybrid power plant including a first electrical motor and a first thermal engine, the second hybrid power plant including a second electrical motor and a second thermal engine, the method comprising:

driving a first propulsor of the first hybrid power plant using one or more of the first electrical motor and the first thermal engine, and driving a second propulsor of the second hybrid power plant using one or more of the second electrical motor and the second thermal engine;

receiving a signal from one or more acoustic sensors, the signal indicative of an initial combined noise signature produced by the propulsion system, the combined noise signature resulting from a first noise signature generated by the first hybrid power plant and a second noise signature generated the second hybrid power plant, determining, from the signal, that an initial amplitude variation of a periodically fluctuating amplitude of the initial combined noise signature is greater than an amplitude variation threshold indicative that the initial combined noise signature generates beats;

modulating a thrust produced by the second hybrid power plant, by changing a power output of one of the second thermal engine and the second electrical motor, to produce a modulated combined noise signature having a modulated amplitude variation less than the initial amplitude variation; and compensating for a difference in thrusts generated by the first hybrid power plant and the second hybrid power plant due to the modulating of the thrust produced by the second hybrid power plant.

2. The method of claim 1, wherein the driving of the first propulsor and the driving of the second propulsor includes setting rotational speeds of output shafts of the first electrical motor and of the second electrical motor to meet thrust targets of the first propulsor and of the second propulsor,
the modulating of the thrust produced by the second hybrid power plant includes changing the power output of the second thermal engine to change the thrust of the second hybrid power plant.

3. The method of claim 1, wherein the driving of the first propulsor and the driving of the second propulsor includes setting rotational speeds of output shafts of the first thermal engine and of the second thermal engine to meet thrust targets of the first propulsor and of the second propulsor,
the modulating of the thrust produced by the second hybrid power plant includes changing the power output of the second electrical motor to change the thrust of the second hybrid power plant.

4. The method of claim 1, wherein the modulating of the thrust produced by the second hybrid power plant includes
setting a rotational speed of an output shaft of the second thermal engine to be greater than a rotational speed of an output shaft of the first thermal engine.

5. The method of claim 4, wherein the compensating for the difference in the thrusts includes
increasing a rotational speed of an output shaft of the first electrical motor to be greater than a rotational speed of an output shaft of the second electrical motor until a first thrust generated by the first propulsor is equal to a second thrust generated by the second propulsor, or
decreasing the rotational speed of the output shaft of the second electrical motor to be less than the rotational speed of the output shaft of the first electrical motor until the second thrust generated by the second propulsor is equal to the first thrust generated by the first propulsor.

6. The method of claim 1, wherein the modulating of the thrust of the second power plant includes
setting a rotational speed of an output shaft of the second electrical motor to be greater than a rotational speed of an output shaft of the first electrical motor.

7. The method of claim 6, wherein the compensating for the difference in the thrusts includes
increasing a rotational speed of an output shaft of the first thermal engine to be greater than a rotational speed of an output shaft of the second thermal engine until a first thrust generated by the first propulsor is equal to a second thrust generated by the second propulsor, or
decreasing the rotational speed of the output shaft of the second thermal engine to be less than the rotational speed of the output shaft of the first thermal engine until the second thrust generated by the second propulsor is equal to the first thrust generated by the first propulsor.

8. The method of claim 1, wherein the second propulsor is a propeller having blades pivotable about respective blade axes, the compensating for the difference in the thrusts includes
pivoting the blades about the blade axes until the thrusts generated by the second propulsor matches a first thrust generated by the first propulsor.

9. The method of claim 1, wherein the compensating for the difference in the thrusts includes
changing a position of one or more control surfaces of the aircraft until a propulsor moment created by a thrust difference generated by the first propulsor and the second propulsor about a yaw axis of the aircraft is compensated by a moment created by the one or more control surfaces of the aircraft about the yaw axis.

10. The method of claim 9, wherein the changing of the position of the one or more control surfaces of the aircraft includes changing a position of a rudder of a vertical stabilizer of the aircraft.

11. The method of claim 1, wherein the modulating of the thrust produced by the second propulsor includes increasing the power output of the one of the second thermal engine and the second electrical motor.

* * * * *